United States Patent
Kohlmorgen et al.

(10) Patent No.: US 6,685,277 B1
(45) Date of Patent: Feb. 3, 2004

(54) METHOD FOR BRAKING A REVOLVABLE SUPERSTRUCTURE OF A WORKING MACHINE AND A PIVOTED BRAKE UNIT

(75) Inventors: Horst Kohlmorgen, Dortmund (DE); Hans-Joachim Waegner, Waltrop (DE); Ulrich Krüger, Lünen (DE)

(73) Assignee: O&K Orenstein & Koppel Aktiengesellschaft, Berlin (DE)

( * ) Notice: Subject to any disclaimer, the term of this patent is extended or adjusted under 35 U.S.C. 154(b) by 0 days.

(21) Appl. No.: 09/980,607

(22) PCT Filed: Jan. 11, 2000

(86) PCT No.: PCT/EP00/00115

§ 371 (c)(1), (2), (4) Date: Mar. 29, 2002

(87) PCT Pub. No.: WO00/68048

PCT Pub. Date: Nov. 16, 2000

(30) Foreign Application Priority Data

May 6, 1999 (DE) .......................................... 199 20 867

(51) Int. Cl.⁷ .............................. B60T 13/58; B60T 1/08
(52) U.S. Cl. ........................................................... 303/3
(58) Field of Search .......................... 192/87.14, 103 F; 180/14.3, 241, 247; 475/76, 79; 254/356; 303/3

(56) References Cited

U.S. PATENT DOCUMENTS

| | | | |
|---|---|---|---|
| 3,894,606 A | * | 7/1975 | Hunck et al. ............. 180/66 R |
| 4,074,891 A | * | 2/1978 | Ritter .................... 254/150 FH |
| 4,183,419 A | * | 1/1980 | Henn et al. ................. 180/243 |
| 4,185,521 A | * | 1/1980 | Beals .......................... 74/865 |
| 4,368,798 A | * | 1/1983 | Meyerle et al. ............. 180/307 |

FOREIGN PATENT DOCUMENTS

| | | |
|---|---|---|
| DE | 31 03 728 | 9/1982 |
| EP | 0 552 649 | 7/1993 |
| EP | 0 671 301 | 9/1995 |

* cited by examiner

Primary Examiner—Christopher P. Schwartz
(74) Attorney, Agent, or Firm—Collard & Roe, P.C.

(57) ABSTRACT

A method and apparatus for braking a revolvable superstructure of a working machine by counter-steering. A working machine has a superstructure which is driven by a motor via a transmission. A control lever operates a control valve which sends signals to a pivoting pump. The control lever has at least one neutral position and at least two switching positions. When the control lever is moved to a braking position, a switching logic circuit coupled to the pivoting pump is actuated and reverses the pivoting pump. This reverses the direction of revolution of the superstructure and brakes the revolution of the superstructure by counter-steering. A monitoring device coupled to the switching logic circuit monitors the number of revolutions of the superstructure. The braking is stopped when the monitoring device detects that the superstructure has come to a standstill.

10 Claims, 4 Drawing Sheets

METHOD FOR BRAKING A REVOLVABLE SUPERSTRUCTURE OF A WORKING MACHINE AND A PIVOTED BRAKE UNIT

CROSS REFERENCE TO RELATED APPLICATIONS

Applicants claim priority under 35 U.S.C. §119 of German Application No. 199 20 867.0 filed May 6, 1999. Applicants also claim priority under 35 U.S.C. §120 of PCT/EP00/00115 filed Jan. 11, 2000. The international application under PCT article 21(2) was not published in English.

BACKGROUND OF THE INVENTION

The invention relates to a method for braking a revolvable superstructure of a working machine, in connection with which the rotational movement of the superstructure is generated via a controllable hydrostatic transmission located in a closed hydraulic circuit, whereby the hydrostatic transmission is controlled for starting the rotational movement via a control lever that is actuated by the driver. The control lever has at least one neutral position and two switching positions for rotating the superstructure in two-directions opposing each other, whereby the braking of the superstructure is achieved by counter-steering against the given direction of rotation of the superstructure. Furthermore, the invention relates to a pivoted brake unit for braking a revolvable superstructure of a working machine comprising a revolvable superstructure which is driven by a controllable hydrostatic transmission located in a closed hydraulic circuit, whereby the hydrostatic transmission can be actuated via a control lever actuated by the driver for starting the rotational movement. Said control lever has at least one neutral position and two switching positions for rotating the superstructure in two directions of rotation opposing each other. In In connection with working machines comprising a revolvable superstructure that is supported on a rotating bearing and comprises a rotational drive train in the form of a transmission, for example a working machine such as an excavator, a crane or the like, the revolvable superstructure is driven by a motor generating the rotational movement. Such a motor may be a hydraulic or electrical motor. In most cases, said motor effects the rotation of the superstructure of the working machine via a transmission engaging the toothing of the rotary bearing by means of a pinion.

The rotational movement of the superstructure can be slowed down in different ways.

Known are, for example friction brakes, which are located either in the revolving transmission or directly on the rotary bearing. The friction brakes are controlled in different ways. It is known to control such friction brakes by means of a pedal actuated by the driver, and to control the friction brake-automatically as soon as the motor of the rotary drive has been shifted into neutral by the operator.

Another known type of braking is braking via the motor generating the rotational movement, whereby the motor is slowed down by a constant or controllable braking valve as soon as said motor has been shifted into neutral by the driver. In connection with a drive via a hydraulic motor, a throttle, for example, located in the hydraulic circuit is connected when the control lever is in the neutral position, and the counterpressure generated via the throttle then brakes the superstructure. Similar solutions are available also for electrical drives generating the rotational movement.

Furthermore, methods or pivoted brake units of the type specified above are known as well. The superstructure is slowed down in connection with such methods and units by a counter-steering action (countering). With such a type of superstructure, the working machine is not equipped with any actual brake or braking system but fitted only with a holding brake, if necessary, which fixes the superstructure when it is at a standstill. Counter-steering is started by the driver by means of his control lever by shifting the system into the opposite direction of rotation. The motor producing the rotational movement then generates an opposite torque and brakes the superstructure. As soon as the rotational movement has come to zero, the control lever has to be shifted to neutral in order to prevent the superstructure from pivoting into the opposite direction.

Such a type of a braking system is favorable because it has a simple type of construction; however, it requires the driver to have certain skills, experience and alertness in order to safely bring the rotational movement to a standstill. Furthermore, with such a type of braking, the braking energy is recycled into the driving system and consequently leads to energy savings.

SUMMARY OF THE INVENTION

The problem of the invention is to improve the braking of the superstructure of a working machine by counter-steering in order to eliminate operational errors by the driver as far as possible and to safely bring the superstructure to a complete standstill.

Said problem is solved according to the invention with a method of the type specified above in that the rotational movement of the superstructure is automatically slowed down by counter-steering when the control lever is in a braking position, preferably in the neutral position. With the control lever in such a position, a pivoting torque set against the current rotational movement by a switching logic circuit reverses the hydrostatic pivoting pump of the hydrostatic transmission until a device monitoring the number of revolutions of the revolvable superstructure, said device being coupled to the switching logic circuit, determines that the superstructure is at a standstill.

The invention thus proposes a method by which automatic braking is accomplished by a counter-steering action that is independent of the driver, i.e. the automatic braking action takes place as soon as the driver has shifted the control lever into the braking position. Furthermore, this makes the braking process independent of the skill, experience and alertness of the driver, and braking is safely accomplished because in the course of the braking action by means of counter-steering, the rotational movement of the superstructure is constantly monitored and the braking action is stopped after the superstructure has been brought to a standstill.

In order to always start the correct counter-torque under all operating conditions of the working machine independently of the actuation of the control lever, and to bring the rotational movement to a standstill, provision is advantageously made that the given direction of rotation of the superstructure is determined by the switching logic circuit because especially if the working machine is operating in an inclined position on a gradient, it is necessary to assure that unintentional rotational movements caused by the force of down drift of the gradient will not lead to errors in the steering action. Such steering errors may occur, for example when the superstructure slightly revolves in the downhill direction while pivoting uphill before the adjusted uphill movement has become effective.

For said purpose, the rotational speed is detected via a tachometer or the like as soon as the driver has started the pivoting movement; the direction of rotation is determined by the switching logic circuit; and the automatic counter-steering action is subsequently started as soon as the driver has shifted the control lever for the pivoting movement into the braking position. The automatic counter-steering process will then remain active until the superstructure has come to a standstill. A holding brake can then be automatically triggered preferably by the switching logic circuit. The recognition of the direction of rotation is subsequently cancelled in the switching logic circuit. In this way, the switching logic circuit prevents any undesirable reversal of the direction of rotation that may be initiated if the driver rapidly counter-steers by hand.

According to the invention, the problem specified above is solved also by means of a pivoted brake unit in that a switching logic circuit is coupled with the hydrostatic pivoting pump of the hydrostatic transmission and with the control valve, and designed in such a way that it automatically brakes the rotational movement of the superstructure by counter-steering as soon as the control lever is in a braking position, preferably in the neutral position, and in that provision is made for a device monitoring the number of revolutions of the superstructure. Said device for monitoring the rotational speed is connected to the switching logic circuit in such a manner that the counter-steering action is stopped when the superstructure has come to a standstill.

The switching logic circuit of the pivoting brake unit is preferably formed by mechanical, electronic, hydraulic and/or pneumatic components, or by an electronic control unit.

Furthermore, for the reasons stated above, provision is made for a device for detecting the direction of rotation. Said device is connected to the switching logic circuit for the purpose of assuring a flawless operation of the pivoted brake unit when working machines are operating in inclined positions. Furthermore, provision is usefully made for a holding brake that is activated by the switching logic circuit when the superstructure is standing still.

Moreover, provision may be advantageously made for a pressure control valve for adjusting the counter-steering torque.

The switching logic circuit may basically comprise one (or two separate) sensors for detecting the number of revolutions and the direction of rotation of the superstructure, which permits using a simplified switching logic circuit that solves the problems arising when the working machine is operating in an inclined position as well.

The switching logic circuit may be formed also by an electronic control unit, in which the pivoting instruction as well as the number of revolutions and the direction of rotation are input by means of the controller set operated by the driver. The electronic control unit then controls the pivoted drive and the parking brake via its outputs in order to accomplish the described type of braking. Furthermore, the control unit may be suited for performing additional functions by means of a selector switch, which has to be actuated by the driver for selecting different modes of operation, i.e. different operating conditions can be set up such as, for example application of the holding brake (freewheeling), or blocking of the rotational movement by applying the holding brake and switching off the control instructions preset by the control lever actuated by the driver, or adjustment of the braking action by means of an adjustable counter-pivoting torque.

BRIEF DESCRIPTION OF THE DRAWINGS

The invention is explained in greater detail in the following by way of example with the help of the drawing showing the following by schematic representations.

DETAILED DESCRIPTION OF THE INVENTION

Figure 1:
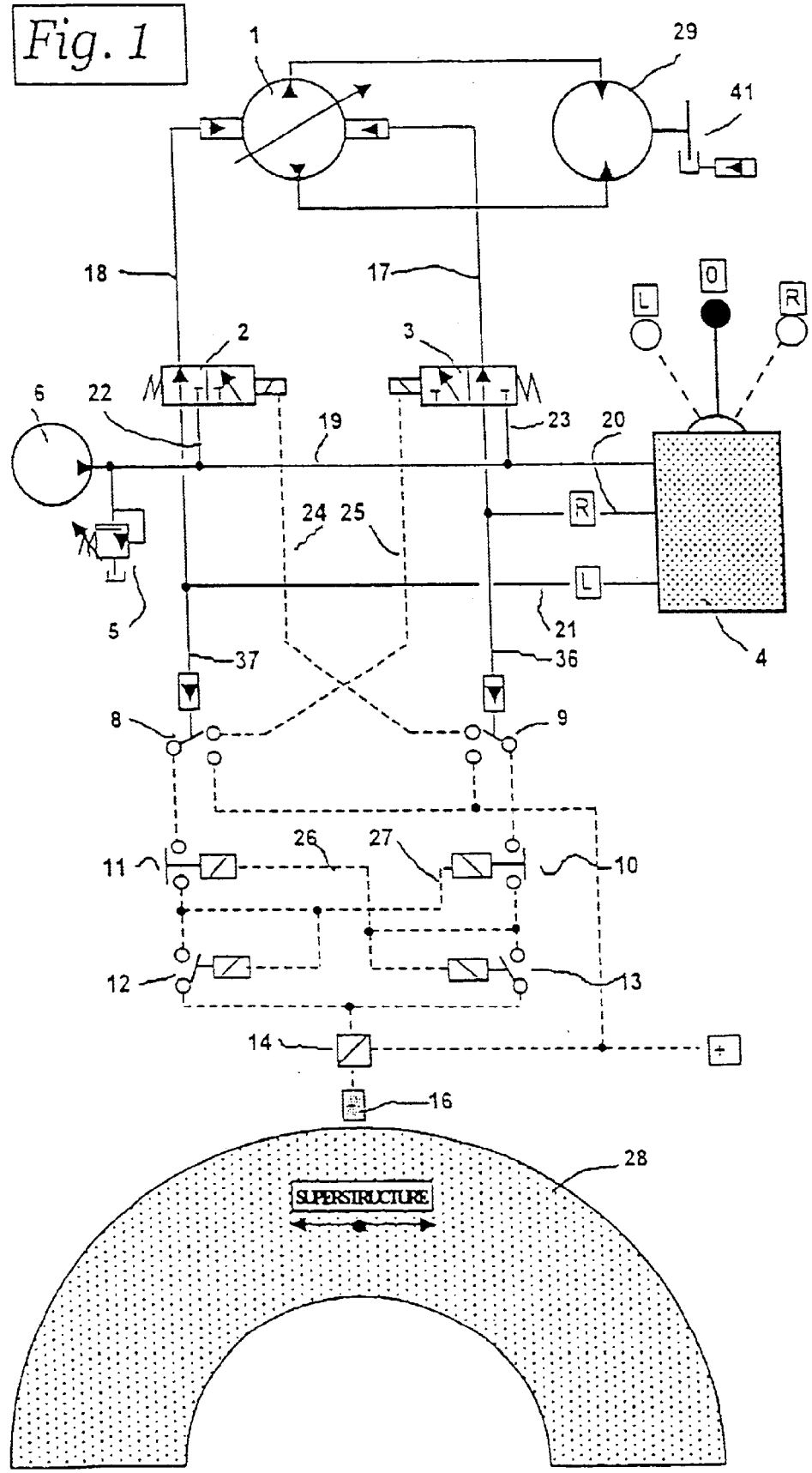
FIG. 1 shows a first embodiment of a pivoted brake unit as defined by the invention.

The same reference symbols are used in all figures for identical and similar components. The superstructure of a working machine that has to be slowed down, of which no other detail is shown, is denoted in this connection by 28. Said superstructure 28 is driven via a motor generating the rotational movement, which may be a hydraulic or an electric motor. In the exemplified embodiment, such a motor is a hydraulic pivoting motor 29. Via a transmission not shown, which engages the toothing Of the rotating bearing with a pinion, said hydraulic pivoting motor effects the rotation of the superstructure 28 of the working machine.

For said purpose, a pivoting pump 1 arranged in a closed hydraulic circuit is controlled with the pivoting motor 29 via the lines 17, 18 in such a manner that the pivoting motor 29 is capable of turning the superstructure 28 of the working machine in both directions of rotation. The line 18 effects the direction of rotation to the left and the line 17 the direction of rotation to the right.

A control valve 4 with a control lever located in the driver's cabin is supplied by an auxiliary pump 6 with control oil via a line 19 and transmits the control signals to the pivoting pump 1 via the lines 20 or 21 and by way of the switching valves 2, 3. The switching valves 2, 3 are wired in such a way that they transmit the switching signals of the control valve 4 in the idle position. Via the lines 22, 23, the auxiliary pump 6 supplies control pressure to the switching valves 2, 3, which are controlled by a switching logic circuit via the lines 24, 25. If, for example, the switching valve is controlled via the line 24, the control signal of the control valve 4 is switched off and the control pressure of the line 22 is fed into the line 18, which effects a counter-steering action.

When the control valve 4 is in the neutral position, the switching outputs of the pressure switches 8, 9 (double-throw switches)t of the switching logic circuit are closed but without voltage, so that the 3/2-way switching valves 2, 3 effecting the automatic counter-steering action are in their idle positions. When the driver steers the pivoting pump 1 with the help of the control valve 4 to the right via the line 20 as well as via a line 36, the pressure switch 9 located in the pre-controlling circuit is reversed and transmits an auxiliary voltage to a relay 13 via a closed relay 10. Said relay 13 closes a switching contact and in this manner causes a frequency-dependent switch 14 to be connected. Said switch 14 is supplied with the signals of a sensor 16 for detecting the number of revolutions, which measures the rotational speed of superstructure 28, and at frequency zero (standstill of the superstructure 28) shuts off the voltage of the switches 12 and 13. This causes the switch 11 to open because of the switching voltage applied, and the switch 12 is opened due to the missing switching voltage. With the pressure switch 9 in the activated state, said switching logic circuit interrupts the flow of current in the direction of the lines 24, 25 and only the current path leading from the frequency-dependent switch 14 to the switch 9 is closed.

With the pivoting movement to the right initiated via the lines 20, 36, the counter-steering action is thus switched to ready by controlling the valve 2 via the line 24.

Now, when the driver then shifts the control lever of the control valve 4 into the neutral position, the switch 9 is switched and the switching voltage flows from the switch 14 via the switches 13, 10 and 9 and by way of the line 24 to the valve 2 and effects the counter-steering action until the superstructure 28 has come to a standstill, and the frequency-dependent switch 14 consequently interrupts the supply of power.

By opening the switch 11 via the line 26, the control of the valve 3 via the line 25 is deactivated until the superstructure has come to a standstill. It is assured in this manner that the braking torque acting in the other direction can be activated only after the superstructure has come to a standstill.

Once the counter-steering action has been switched to ready for a pivoting direction, the corresponding 3/2-way switching valve 2 is reversed at the moment at which the pre-controlling pressure has broken down and falls short of the responding pressure of the corresponding pressure switch 9 (control lever of the control valve 4 shifted into the neutral or counter direction). A defined pre-controlling pressure is passed to the counter side of the pivoting pump 1 and effects a control of the pivoting pump 1 as it occurs in connection with the normal counter-steering action started by the driver. Once the superstructure 28 has come to a standstill and the control valve 4 for the function "superstructure pivoting" is in the neutral position, the voltage feed to the relay 13—which is in the self-retaining position—and to the corresponding 3/2-way switching valve 2 is interrupted by the frequency-dependent switch 14. The automatic counter-steering action (countering) is now terminated. The maximum delay effected in connection with the automatic counter-steering action may be varied via a pressure-limiting valve 5 depending on the given application.

Figure 2:
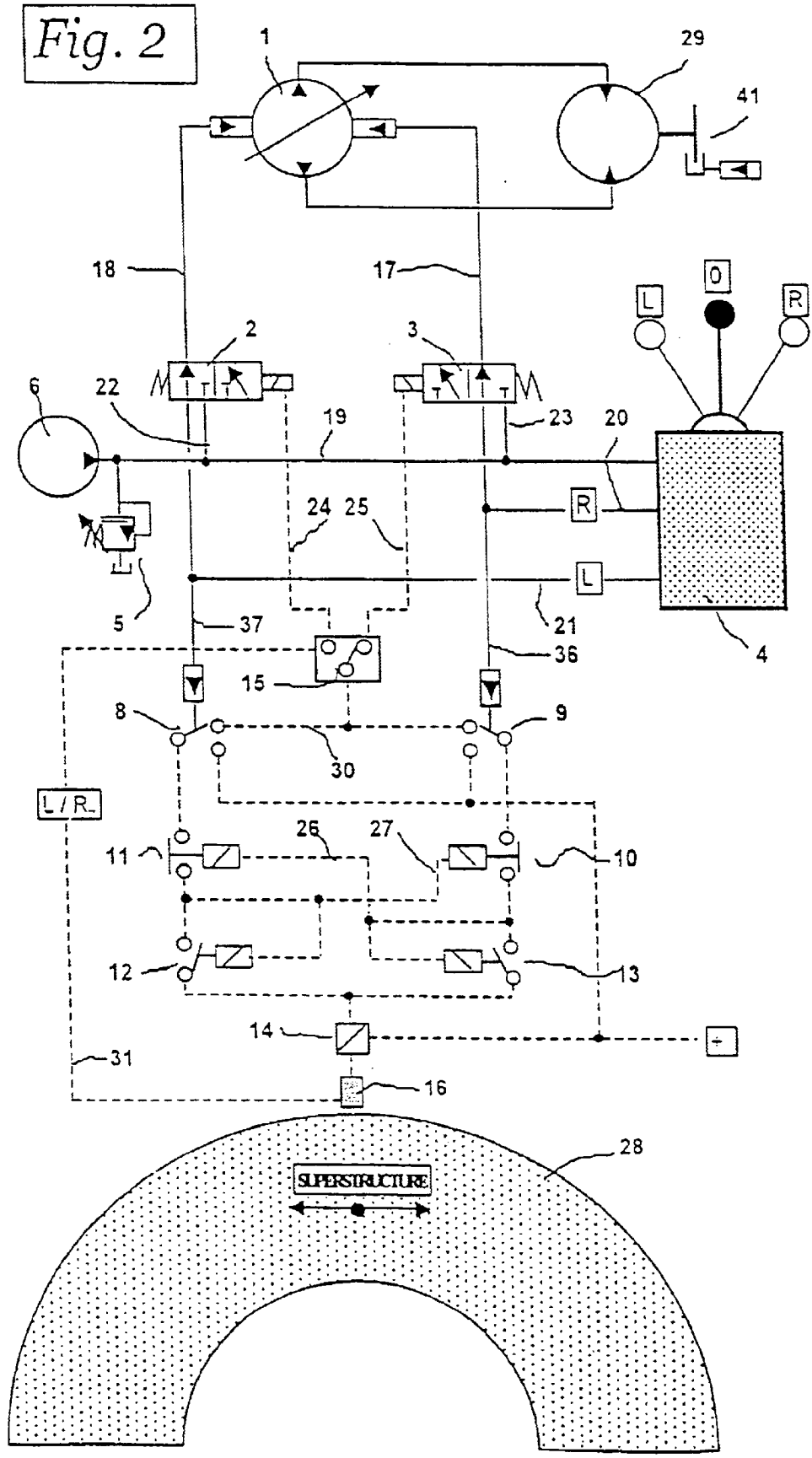
FIG. 2 shows a variation of the first embodiment for work operations in inclined positions.

The embodiment of the pivoted brake unit according to FIG. 2 is different from the one according to FIG. 1 in that it operates in a flawless manner also when the working machine is operating in slanted positions. In such a case, the switching signal generated for the automatic counter-steering action is additionally transmitted via the line 30 to the switch 15, which is controlled by the "direction-of-rotation" signal of the sensor 16 via the line 31, so that the correct side of the pivoting pump is controlled via the switching valves 2, 3. The correct controlling direction is secured in this way when the working machine is operating in inclined working positions.

Figure 3:
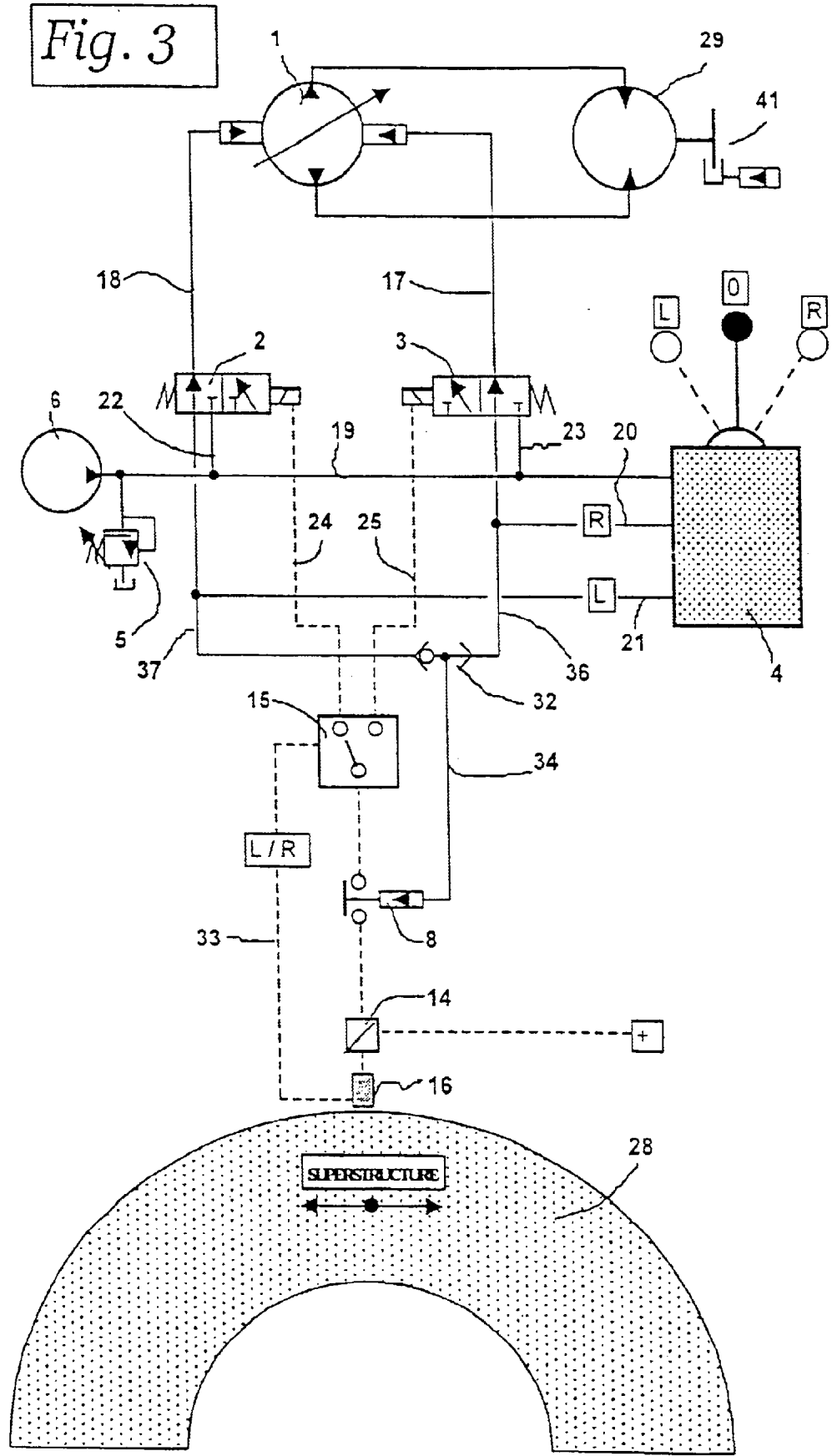
FIG. 3 shows a second embodiment of the automatic pivoted brake unit.

FIG. 3 shows a further embodiment representing a second embodiment of the automatic pivoted brake unit. In said embodiment, the switching valves 2, 3 are controlled by way of the lines 24 and 25, whereby said valves are switched by the switch 16 depending on the direction of rotation. The pre-controlling pressures for pivoting to the left or right are transmitted via the lines 20, 21, 36 and 37 to an alternating valve 32 and by means of a line 34 to a common pressure switch 8, which operates as an opener and starting with a preset control pressure, interrupts the voltage path leading from the switch 14 switching in dependence on the frequency, to the switch 15 switching in dependence on the direction of rotation, and further leading to the switch valves 2 or 3. If, in the course of a pivoting movement (switch 14 closed), the control lever of the control valve 4 for pivoting is shifted into the neutral position, the pressure switch 8 closes and the voltage path from the switch 34 to the corresponding switching valve 2 or 3 is closed. The corresponding switching valve 2 or 3 is electrically controlled via the switch 15, which, controlled by the "direction-of-rotation" sensor 16, controls the one or other switching output via the line 13 depending on the direction of rotation. It is secured in this manner that the correct side is controlled in the course of counter-steering.

Figure 4:
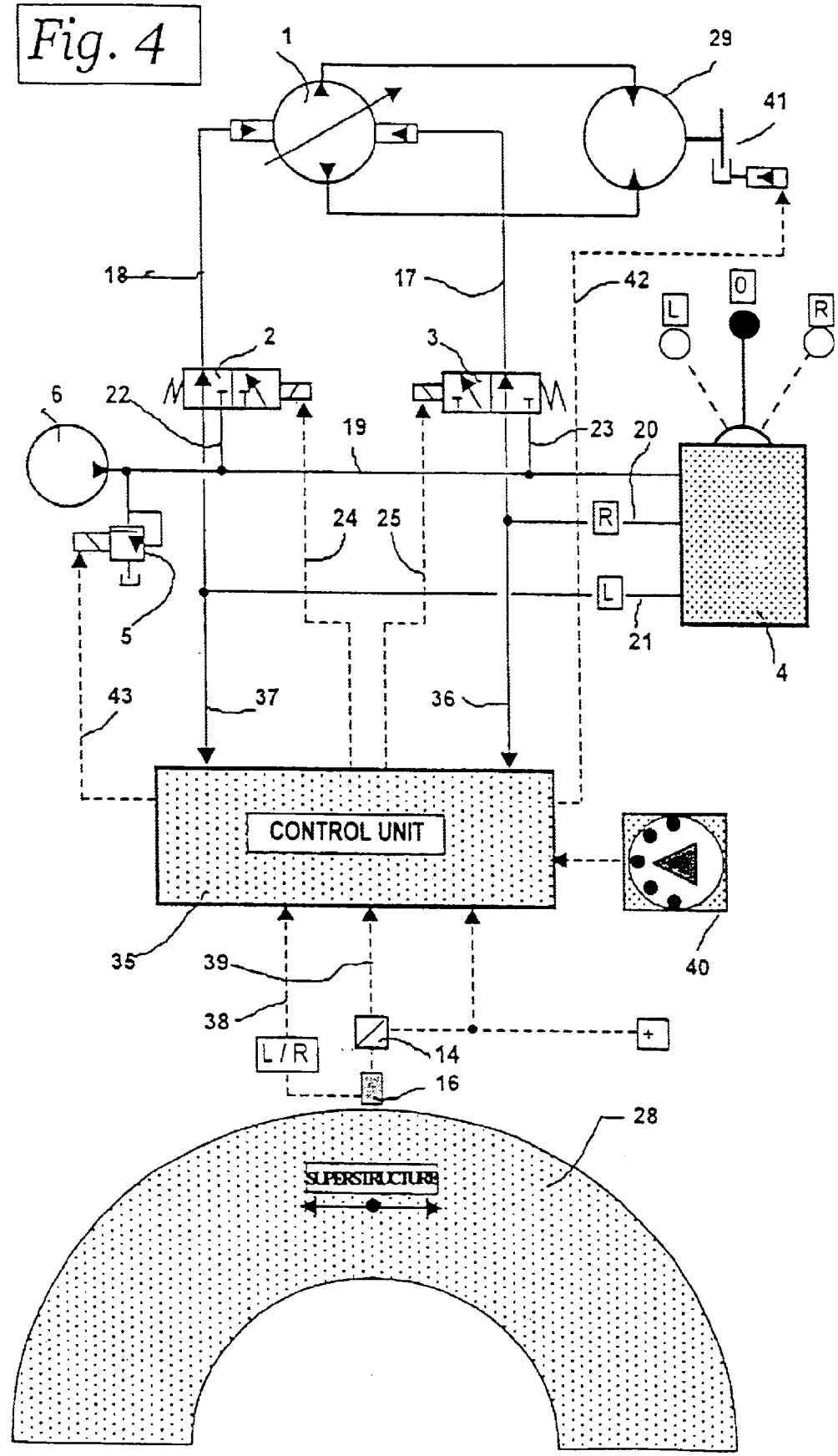
FIG. 4 shows a third embodiment comprising a control unit.

FIG. 4 shows a third embodiment of the pivoted brake unit. The switching logic circuit is formed in said embodiment by an electronic control unit 35. Said control unit 35 is supplied with the input signals 36, 37 of the control valve 4, the recognition of the pivoting direction by the sensor 16, as well as with the "rotation" signal 16, 14 via a line 39. Said signals are linked in the control unit 35, for example in a manner such as shown in FIGS. 1 to 3.

Furthermore, via a selector switch 40 for selecting the mode of operation, which is actuated by the driver, the control unit 35 receives signals for carrying out fixed conditions, which are, for example:

Blocking of the brake 41 via the line 42;

Disregarding of control lever functions (lines 36, 37);

Shutoff of counter-steering action, i.e. freewheeling with the control lever of the control valve 4 in the neutral position (lines 24, 25);

Setting of the braking torque by adjusting the pressure control valve 5 via the line 43.

What is claimed is:

1. A method for braking a revolvable superstructure of a working machine having a superstructure driven by a motor via a transmission, the method comprising:

(a) moving a control lever to a braking position, wherein said control lever operates a control valve which transmits control signals to a pivoting pump, and wherein said control lever comprises at least one neutral position and at least two switching positions corresponding to two opposing directions of revolution of the superstructure;

(b) actuating a switching logic circuit coupled to said pivoting pump when said control lever is in said braking position, wherein said switching logic circuit reverses said pivoting pump, which reverses a direction of revolution of the superstructure and automatically brakes a revolution of the superstructure by counter-steering;

(c) monitoring a number of revolutions of the superstructure with a monitoring device coupled to said switching logic circuit;

(d) stopping said braking of the revolution of the superstructure by counter-steering when said monitoring device detects that the superstructure has come to a standstill.

2. The method according to claim 1, further comprising the step of determining a given direction of rotation of the superstructure with said switching logic circuit.

3. The method according to claim 1, further comprising the step of automatically triggering a holding brake with said switching logic circuit when the superstructure is at a standstill.

4. A pivoted brake unit for braking a revolvable superstructure of a working machine having a superstructure driven by a motor via a transmission, the pivoted brake unit comprising:

(a) a pivoting pump arranged in a closed hydraulic circuit with the motor and the transmission;

(b) a control valve which transmits control signals to said pivoting pump;

(c) a control lever operating said control valve comprising at least one neutral position and at least two switching positions, each of said at least two switching positions corresponding to an opposing direction of revolution of the superstructure;

(d) a switching logic circuit coupled to said pivoting pump and actuated by said control lever;

(e) a monitoring device coupled to said switching logic circuit for monitoring a number of revolutions of the superstructure;

wherein said switching logic circuit automatically brakes a revolution of the superstructure by counter-steering when said control lever is in a braking position and wherein said switching logic circuit stops braking revolution of the superstructure by counter-steering when said monitoring device detects that the superstructure has come to a standstill.

5. The pivoted brake unit according to claim 4, wherein said switching logic circuit is formed by mechanical, electronic, hydraulic or pneumatic components or by an electronic control unit.

6. The pivoted brake unit according to claim 4, further comprising a monitoring device for detecting a direction of rotation of the superstructure, said monitoring device being connected to said switching logic circuit.

7. The pivoted brake unit according to claim 4, further comprising a holding brake which is activated by said switching logic circuit after the superstructure has come to a standstill.

8. The pivoted brake unit according to claim 4, further comprising a pressure control valve for adjusting a counter-steering torque.

9. The pivoted brake unit according to claim 4, wherein said switching logic circuit is formed by an electronic control unit designed in a such a manner that said electronic control unit is suited for carrying out additional functions by means of a selector switch for selecting a mode of operation, wherein said selector switch is actuated by a driver.

10. The pivoted brake unit according to claim 4 wherein said switching logic circuit automatically brakes the revolution of the superstructure by counter-steering when said control lever is in said at least one neutral position.

* * * * *

UNITED STATES PATENT AND TRADEMARK OFFICE
CERTIFICATE OF CORRECTION

PATENT NO.    : 6,685,277 B1
DATED         : February 3, 2004
INVENTOR(S)   : Kohlmorgen et al.

It is certified that error appears in the above-identified patent and that said Letters Patent is hereby corrected as shown below:

Title page,
Item [73], Assignee, please change "Berlin" to -- Dortmund --.

Signed and Sealed this

Twentieth Day of September, 2005

JON W. DUDAS
*Director of the United States Patent and Trademark Office*